US011858257B2

(12) United States Patent
Odden et al.

(10) Patent No.: US 11,858,257 B2
(45) Date of Patent: Jan. 2, 2024

(54) CURE LAMP SHUTTER

(71) Applicant: Entrust Corporation, Shakopee, MN (US)

(72) Inventors: Matt Odden, Shakopee, MN (US); Cory Wooldridge, Shakopee, MN (US); Andrew Luu, Shakopee, MN (US); Daniel Sarkinen, Shakopee, MN (US); Jon Wawra, Shakopee, MN (US); Randy Jordan, Shakopee, MN (US); Brendan Hinnenkamp, Shakopee, MN (US); Brett McDonough, Shakopee, MN (US); Tim Flitsch, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/810,955

(22) Filed: Jul. 6, 2022

(65) Prior Publication Data

US 2023/0015294 A1 Jan. 19, 2023

Related U.S. Application Data

(60) Provisional application No. 63/222,659, filed on Jul. 16, 2021.

(51) Int. Cl.
*B41J 11/00* (2006.01)

(52) U.S. Cl.
CPC ............................... *B41J 11/00214* (2021.01)

(58) Field of Classification Search
CPC .. B41J 11/00214; B41J 3/385; B41J 11/0015; B41J 11/00212; B41J 11/00218; B41J 13/12
See application file for complete search history.

(56) References Cited

U.S. PATENT DOCUMENTS

| | | | |
|---|---|---|---|
| 4,825,054 | A | 4/1989 | Rust et al. |
| 4,995,501 | A | 2/1991 | Lundstrom et al. |
| 5,266,781 | A | 11/1993 | Warwick et al. |
| 5,837,991 | A | 11/1998 | LaManna et al. |

(Continued)

FOREIGN PATENT DOCUMENTS

| | | |
|---|---|---|
| JP | 2007-276414 A | 10/2007 |
| JP | 2012-045908 A | 3/2012 |

OTHER PUBLICATIONS

International Search Report and Written Opinion, International Patent Application No. PCT/IB2022/056260, dated Oct. 13, 2022 (9 pages).

(Continued)

*Primary Examiner* — Bradley W Thies
(74) *Attorney, Agent, or Firm* — Hamre, Schumann, Mueller & Larson, P.C.

(57) ABSTRACT

A DOD print station has at least one DOD print head that applies radiation curable material, to a surface of an identification document. A curing station is adjacent to the DOD print station. The curing station includes at least one radiation emitting device, for example a UV light emitting device, that cures the radiation curable material applied to the surface. The curing station is configured to prevent stray radiation emitted from the radiation emitting device from impinging on the DOD print head(s) and prevent exposure to the operator of the DOD print station.

18 Claims, 12 Drawing Sheets

(56) References Cited

U.S. PATENT DOCUMENTS

| | | | |
|---|---|---|---|
| 6,131,817 | A | 10/2000 | Miller |
| 6,543,890 | B1 | 4/2003 | Ylitalo et al. |
| 6,695,205 | B1 | 2/2004 | Lundstrom et al. |
| 6,783,067 | B2 | 8/2004 | Kreuter et al. |
| 6,902,107 | B2 | 6/2005 | Shay et al. |
| 7,398,972 | B2 | 7/2008 | Schuller et al. |
| 7,434,728 | B2 | 10/2008 | Paulson et al. |
| 7,866,810 | B2 | 1/2011 | Campion et al. |
| 10,576,769 | B2 | 3/2020 | Wooldridge et al. |
| 10,889,129 | B2 | 1/2021 | Beech |
| 2003/0011670 | A1 | 1/2003 | Shirakawa |
| 2013/0220984 | A1 | 8/2013 | Cronin et al. |
| 2013/0286060 | A1* | 10/2013 | Duffield .................. B41J 29/38 347/102 |
| 2018/0326763 | A1 | 11/2018 | Wooldridge et al. |
| 2019/0047309 | A1 | 2/2019 | Weiss et al. |
| 2021/0086530 | A1 | 3/2021 | Hinnenkamp |

OTHER PUBLICATIONS

HP Development Company, L.P., “HP Scitex FB700/FB500 Industrial Printer—Shutter Errors”, 8 pages (2021).

* cited by examiner

Fig. 5
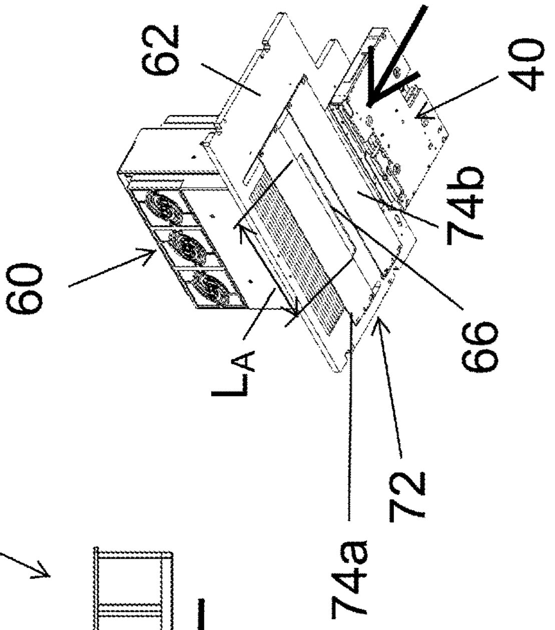
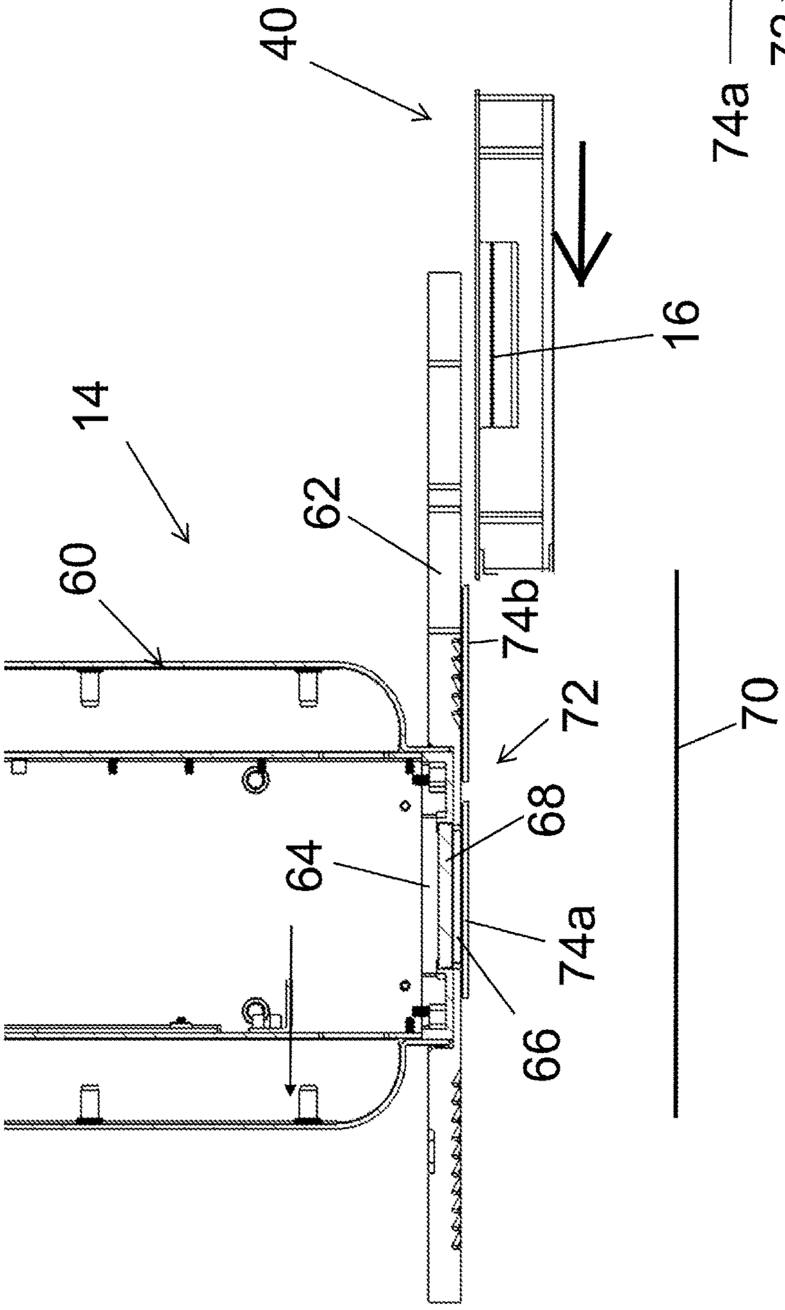
Fig. 4

CURE LAMP SHUTTER

FIELD

This technical disclosure relates to drop-on-demand (DOD) printing on identification documents such as plastic cards including, but not limited to, identification cards, driver's licenses, financial cards including credit and debit cards, and other plastic cards, as well as passports and pages thereof.

BACKGROUND

The use of DOD printing to print images, patterns and text on identification documents is known. To improve the durability of the printed material to the surface of the identification document, the printed material applied to the card surface by the DOD printer may be designed to be cured using radiation, such as ultraviolet (UV) radiation, after the printed material is applied to the document surface. In some instances, during curing, stray UV light could impinge upon one or more DOD printheads in the DOD printer, thereby causing undesired curing of UV curable material in or on the DOD printheads. An operator of the DOD printer could also be exposed to stray UV light, posing a potential health hazard to the operator.

SUMMARY

Identification document printing systems and methods using DOD printing with radiation curable materials are described herein. A DOD print station has at least one DOD print head that applies radiation curable material, for example UV curable material, to a surface of an identification document. A curing station is adjacent to the DOD print station. The curing station includes at least one radiation emitting device, for example a UV light emitting device, that cures the radiation curable material applied to the surface. The curing station is configured to prevent stray radiation emitted from the radiation emitting device from impinging on the DOD print head(s) and prevent exposure to the operator of the DOD print station.

Although DOD printing is described in detail herein, the techniques described herein can be used in any identification document printing system where it is desired to reduce or eliminate stray light emitted from a radiation emitting device from reaching other components of the printing system. For example, it is known to print radiation curable material, such as radiation curable ink, from a thermal transfer print ribbon onto a plastic card. One example is described in U.S. Pat. No. 10,889,129 which is incorporated herein by reference in its entirety. It would be beneficial to prevent or minimize stray radiation emitted by the radiation emitting device from impinging on the thermal transfer print ribbon or other components of the identification document printing system that could be negatively impacted by premature exposure to radiation emitted by the radiation emitting device.

The identification document can be a plastic card including, but not limited to, an identification card, a driver's license, a financial card including a credit and debit card, a gift card, and other plastic cards, or a page of a passport or other identification booklet.

The radiation curable material that is printed by the DOD print station can be any material that is curable by the application of radiation, for example ultra-violet (UV) radiation, to the printed material after it is applied to the surface of the identification document. Examples of materials that can be printed by a DOD print station include, but are not limited to, ink, varnish and any other radiation curable materials that can be applied to identification documents by the DOD print station.

The DOD print station is incorporated into an identification document personalization system (i.e. in the case of plastic cards, termed a plastic card personalization system; in the case of a passport, termed a passport personalization system). The personalization system includes at least the DOD print station and a radiation curing station. The personalization system may also include a plasma treatment station that plasma treats a surface of the identification document prior to the DOD printing, an input that can hold multiple documents and input the documents one-by-one for processing in the system, an output that can hold multiple documents after being processed, and additional document processing stations.

The personalization system may be configured as a large volume batch document production machine, often configured with multiple processing stations or modules, typically referred to as a central issuance system, that processes multiple documents at the same time and is designed to personalize identification documents in relatively large volumes, for example measured in the high hundreds or even thousands per hour. Alternatively, the personalization system may be configured as a desktop document printer that has a relatively small footprint intended to permit the desktop document printer to reside on a desktop and that is designed to personalize documents in relatively small volumes, for example measured in tens or low hundreds per hour.

In one embodiment, the radiation emitting device of the curing station is controlled so that the radiation emitting device is actuated to an on state from an off state after the radiation curable material is applied to the surface of the identification document and prior to a leading edge of the identification document reaching an exposure aperture in the curing station, and the radiation emitting device is controlled so that the radiation emitting device is actuated to the off state after a trailing edge of the identification document clears the aperture.

In one embodiment described herein, a method of printing radiation curable material on an identification document includes applying the radiation curable material to a surface of the identification document in a print station. After applying the radiation curable material, the identification document is transported to a curing station for curing the radiation curable material applied to the surface of the identification document. The curing station includes at least one radiation emitting device that is controlled to have an on state and an off state and that emits radiation when in the on state that is suitable for curing the radiation curable material applied to the surface of the identification document, and an aperture through which radiation emitted by the at least one radiation emitting device can travel toward the identification document. The radiation curable material applied to the surface of the identification document is then cured as the identification document is transported through the curing station in a transport direction. The at least one radiation emitting device is controlled so that the at least one radiation emitting device is actuated to the on state from the off state after the radiation curable material is applied to the surface of the identification document and prior to a leading edge of the identification document reaching the aperture, and so that the at least one radiation emitting device is actuated to the off state after a trailing edge of the identification document clears the aperture.

In another embodiment described herein, an identification document personalization system includes a print station that is configured to apply radiation curable material to a surface of an identification document. A curing station is adjacent to the print station and includes at least one radiation emitting device that is controlled to have an on state and an off state and that emits radiation when in the on state that is suitable for curing radiation curable material applied to the surface of the identification document, and an aperture through which radiation emitted by the at least one radiation emitting device can travel toward the identification document. A transport mechanism is provided that transports the identification document from the print station to and through the curing station in a transport direction. In addition, a controller is connected to the curing station that controls the curing station so that the at least one radiation emitting device is actuated to the on state from the off state after the radiation curable material is applied to the surface of the identification document and prior to a leading edge of the identification document reaching the aperture, and so that the at least one radiation emitting device is actuated to the off state after a trailing edge of the identification document clears the aperture.

DRAWINGS

FIG. 1 schematically illustrates an identification document personalization system described herein.

FIG. 4 is a detailed side view of a portion of the curing station described herein.

FIG. 5 is a bottom perspective view of the curing station of FIG. 4.

DETAILED DESCRIPTION

Figure 1:
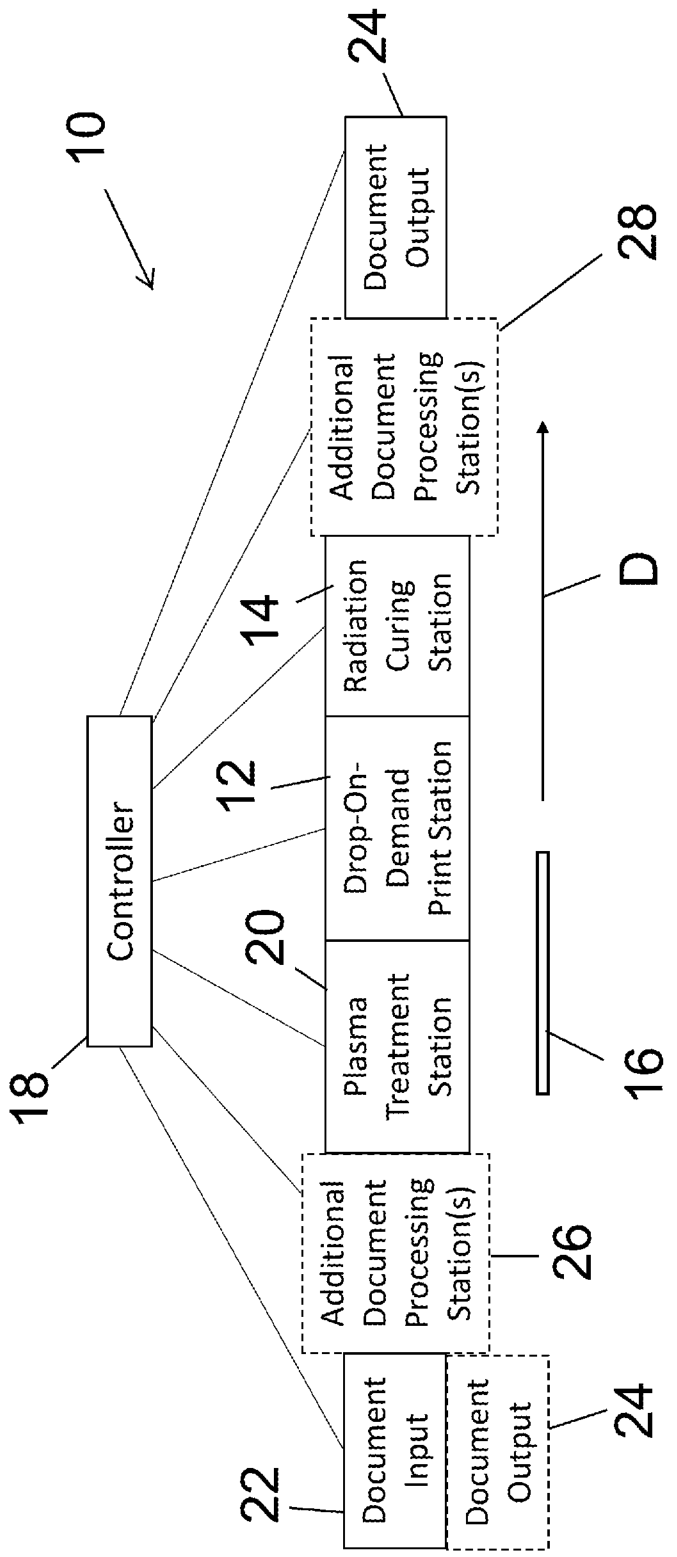

Identification document personalization systems and methods are described herein. Referring to FIG. 1, an example of an identification document personalization system 10 that can implement the methods described herein includes a DOD print station 12 with at least one DOD print head that applies radiation curable material, for example UV curable material, to a surface of an identification document. A curing station 14 is adjacent to the DOD print station. The curing station 14 includes at least one radiation emitting device, for example a UV light emitting device, that cures the radiation curable material applied to the surface. The curing station 14 is configured to prevent stray radiation emitted from the radiation emitting device from impinging on the DOD print head(s) and prevent exposure to the operator of the system 10 and the DOD print station 12.

The system 10 is configured to personalize an identification document 16. During personalization, the document 16 generally travels in the direction of the arrow D along a document travel path which may be linear. Transport of the document 16 along the card travel path between each station and through each station is achieved using suitable transport mechanisms known in the art including rollers, belts, tabbed belts, and combinations thereof. The transport mechanisms may be configured to transport the document 16 in a single, forward direction, or the transport mechanisms may be reversible to transport the document 16 in forward and reverse directions. Document transport mechanisms are well known in the art including those disclosed in U.S. Pat. Nos. 6,902,107, 5,837,991, 6,131,817, and 4,995,501 and U.S. Published Application Nos. 2013/0220984 and 2018/0326763, each of which is incorporated herein by reference in its entirety. A person of ordinary skill in the art would readily understand the type(s) of document transport mechanisms that could be used, as well as the construction and operation of such document transport mechanisms.

The print station 12 can be a conventional DOD print station known in the art that includes at least one, for example a plurality of, DOD printheads, one printhead for each ink color and other material, such as varnish, to be printed. The inks and other materials printed by the print station 12 are curable by radiation, such as ultraviolet (UV) radiation, after being applied to the document 16. The print station 12 further includes a document transport mechanism for transporting the document 16 along the document transport path within the print station 12. The document transport mechanism of the print station 12 may be reversible to permit transport of the document 16 in forward and reverse directions in the print station 12. Operation of the print station 12 can be controlled by a suitable controller 18 which can control the entire system 10, or the print station 12 can have its own dedicated controller. A DOD print station that can be utilized is the DOD printing module available from Entrust Corporation of Shakopee, Minnesota.

With continued reference to FIG. 1, the radiation curing station 14 is positioned in the system 10 so as to be able to apply radiation to radiation curable material that is applied to the surface of the document 16 by the DOD print station 12 to fully cure the radiation curable material. For example, the radiation curing station 14 can be located downstream of the print station 12. The radiation curing station 14 includes a document transport mechanism for transporting the document 16 along the transport path within the station 14. The document transport mechanism of the station 14 may be reversible to permit transport of the document 16 in forward and reverse directions in the station 14. The station 14 is configured with one or more radiation emitting devices to emit radiation to cure the radiation curable material. The device(s) may be on or more light emitting diodes, and the radiation may be UV radiation. The radiation emitting device(s) may be configured to apply radiation to the entire document surface in a single pass of the document 16 and the radiation emitting device(s) relative to one another, or apply radiation only to portions of the document surface containing radiation curable material. Operation of the station 14 can be controlled by the controller 18, or the station 14 can have its own dedicated controller. A radiation curing station that can be utilized is described in U.S. 2021/

0086530, the entire contents of which are incorporated herein by reference, or available from Entrust Corporation of Shakopee, Minnesota.

With continued reference to FIG. 1, the system 10 may also optionally include a plasma treatment station 20 that is positioned in the system 10 so as to be able to plasma treat the surface of the document 16 prior to DOD printing. For example, the plasma treatment station 20 can be located upstream of the print station 12. The plasma treatment station 14 includes a document transport mechanism for transporting the document 16 along the document transport path within the station 20. The document transport mechanism of the station 20 may be reversible to permit transport of the document 16 in forward and reverse directions in the station 20. The station 20 may be configured to move a plasma treatment nozzle (also referred to as a plasma treater) and the document 16 relative to one another during plasma treatment of the document surface. In one embodiment, the document 16 is held stationary during plasma treatment while the plasma nozzle is moved relative to the document 16, with the document transport mechanism of the station 20 moving the document into treatment position and transporting the document 16 from the station 20 after treatment. In another embodiment, the plasma nozzle is stationary while the document 16 is moved relative to the plasma nozzle during plasma treatment. The plasma nozzle of the station 20 may be configured to treat only a portion of the document surface in a single pass of the document 16 and the nozzle relative to one another, or the plasma nozzle may be configured to treat the entire document surface in a single pass of the document 16 and the nozzle relative to one another. Operation of the station 20 can be controlled by the controller 18, or the station 20 can have its own dedicated controller. A plasma treatment station that can be utilized is described in U.S. Pat. No. 10,576,769, the entire contents of which are incorporated herein by reference.

The system 10 can also include a document input 22 and a document output 24. The document input 22 is configured to hold a plurality of documents waiting to be processed and to input each document one-by-one for subsequent processing. The document output 24 is configured to hold a plurality of the documents 16 after processing has been completed. The input 22 and the output 24 can be positioned in the system 10 at any locations suitable for performing their input and output functions. For example, the input 22 can be located at the front end of the system 10 while the output 24 can be located at the tail end of the system 10 as shown in FIG. 1. Alternatively, both the input 22 and the output 24 can be located at the front end of the system 10. Other locations of the input 22 and the output 24 in the system 10 are possible.

The system 10 may also include optional additional document processing station(s) 26 between the input 22 and the print station 12 and/or optional additional document processing station(s) 28 between the radiation curing station 14 and the output 24. The optional additional processing station(s) 26, 28 can be document processing stations known in the art to perform document processing operations that are known in the art. For example, the optional additional processing stations 26, 28 can include a magnetic stripe read/write system that is configured to read data from and/or write data to a magnetic stripe on a plastic card, and/or an integrated circuit chip programming system that is configured to program an integrated circuit chip on a card or a passport. Magnetic stripe read/write systems and integrated circuit chip programming systems are disclosed, for example, in U.S. Pat. Nos. 6,902,107, 6,695,205 the entire contents of which are incorporated herein by reference, and can be found in the MX family of central issuance systems available from Entrust Corporation of Shakopee, Minnesota. The optional additional processing station(s) 26, 28 can also be configured to perform one or more of embossing; indenting; laminating; laser marking; apply a topcoat; a quality control station that is configured to check the quality of personalization/processing applied to the documents; a security station that is configured to apply a security feature such as a holographic foil patch to the documents; and other document processing operations.

The system 10 may be configured as a large volume batch plastic card production machine, often configured with multiple processing stations or modules, typically referred to as a central issuance system, that processes multiple document at the same time and is designed to personalize documents in relatively large volumes, for example measured in the high hundreds or even thousands per hour. An example of a central issuance system is the MX or MPR-lines of central issuance systems available from Entrust Corporation of Shakopee, Minnesota Additional examples of central issuance systems are disclosed in U.S. Pat. Nos. 4,825,054, 5,266,781, 6,783,067, and 6,902,107, all of which are incorporated herein by reference in their entirety. Alternatively, the system 10 may be configured as a desktop document printer that has a relatively small footprint intended to permit the desktop document printer to reside on a desktop and that is designed to personalize document in relatively small volumes, for example measured in tens or low hundreds per hour. An example of a desktop document printer is the CD800 Card Printer available from Entrust Corporation of Shakopee, Minnesota Additional examples of desktop printers are disclosed in U.S. Pat. Nos. 7,434,728 and 7,398,972, each of which is incorporated herein by reference in its entirety.

Figure 2B:
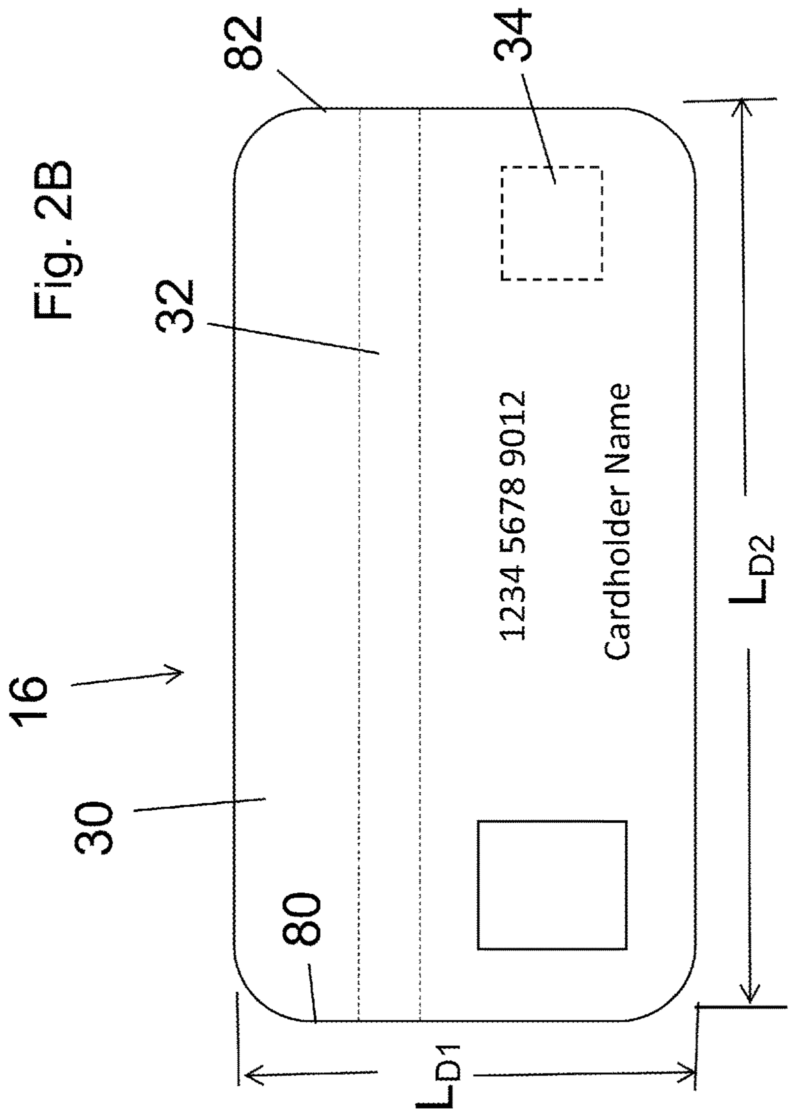
FIG. 2B illustrates an example of an identification document in the form of a plastic card.
Figure 2A:
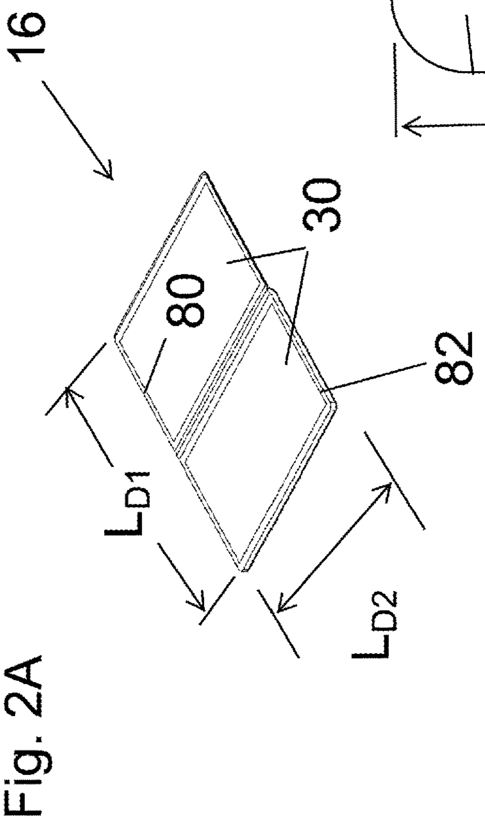
FIG. 2A illustrates an example of an identification document in the form of a passport booklet.

Referring to FIGS. 2A and 2B, the identification document 16 can be a passport (FIG. 2A) or other identification document booklet, or a plastic card (FIG. 2B) including, but not limited to, an identification card, a driver's license, a financial card including a credit and debit card, a gift card, and other plastic cards. The passport and the plastic card each include a surface 30 that is intended to be printed on by the print station 12 to form personal data. Personal data can include a printed image (i.e. a portrait image) of the intended holder of the passport or plastic card, where the printed image can be a monochromatic image or a multicolor image for example printed from cyan, magenta, yellow and black (CMYK) inks, the name, address and other personal of the document holder, or a document number such as a passport number or an account number. The document 16 can further include additional personal data provided on the surface 30 or on an opposite surface such as a CVV number. The additional personal data may be printed onto the document 16 using the print station 12 and/or using other known printing techniques, for example direct to document thermal printing, retransfer printing, laser marking, and other printing techniques known in the art of identification document processing. In the case of a plastic card depicted in FIG. 2B, the card may also include a magnetic stripe 32 (often disposed on the surface that is opposite the surface 30) that can be magnetically encoded with data. The passport in FIG. 2A and the plastic card in FIG. 2B may also include an integrated circuit chip 34 that can be programmed with data. For convenience, the document 16 may hereinafter be described as being a passport. However, the concepts described herein are applicable to plastic cards as well.

Figure 3C:
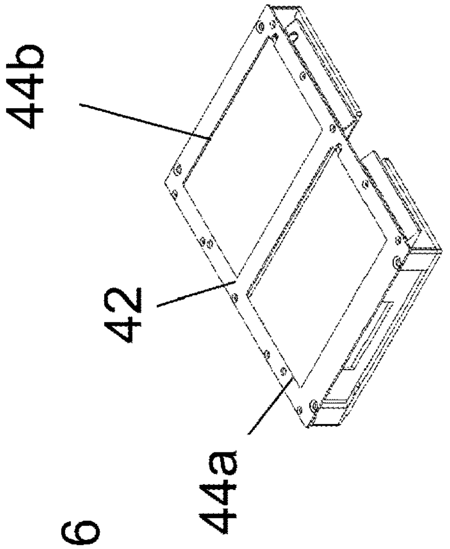
FIGS. 3A, 3B and 3C illustrate a sequence of loading a passport booklet onto a carrier prior to drop-on-demand printing.
Figure 3B:
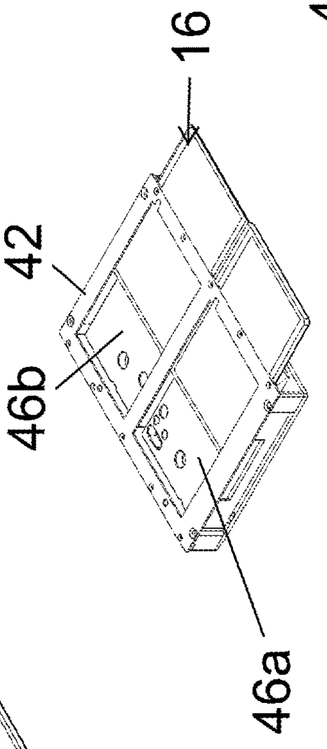
Figure 3A:
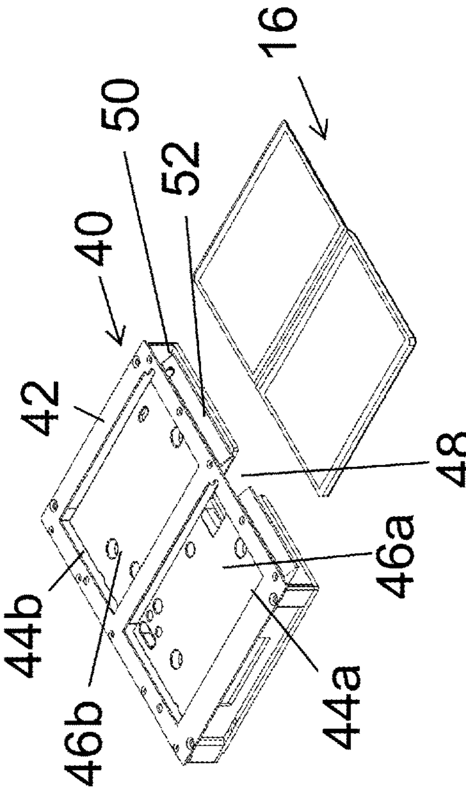

As described above, one or more document transport mechanisms are used to transport the document 16 in the system 10. FIGS. 3A-3C illustrate one example of a document transport mechanism in the form of a carrier 40 onto which a passport booklet is loaded prior to DOD printing in the DOD print station 12. The carrier 40 is configured to hold the passport booklet open in the print station 12 for printing, as well as in the radiation curing station 14 during curing of the printed material. In the illustrated example, the carrier 40 includes a window plate 42 that defines two windows 44*a*, 44*b*. A spring-biased paddle 46*a*, 46*b* is associated with each window 44*a*, 44*b*, and a spine channel 48 is defined between the paddles 46*a*, 46*b* that receives the spine of the passport. The carrier 40 includes an inlet side 50 with an input/output slot 52 between the window plate 42 and the paddles 46*a*, 46*b* through which the passport is inserted into and removed from the carrier 40. When the document 16 is a plastic card, the transport mechanism disclosed in US 2018/0326763 can be used to transport the plastic card.

To load the passport onto the carrier 40, the passport booklet is opened as shown in FIG. 3A. The passport booklet can be mechanically opened using a mechanical opening mechanism known in the art, or the passport booklet can be manually opened and then manually inserted into the system 10. With reference to FIG. 3B, the opened passport booklet is then slid into the slot 52 with the spine of the booklet facing downward and positioned in the spine channel 48. When the booklet is fully inserted onto the carrier 40 (FIG. 3C), a portion of one-half of the booklet is visible in the window 44*a* and a portion of the other half of the booklet is visible in the window 44*b*. The booklet is held stationary by the carrier 40 with the portion(s) of the booklet visible in the window(s) 44*a*, 44*b* available to be printed on. The carrier 40 then carries the booklet to and through the print station 12 (FIG. 1), to and through the curing station 14, and optionally to and through the plasma treatment station 20 if present. The booklet may also be held by the carrier in any of the additional processing stations 26, 28. At the conclusion of processing or earlier, the booklet is removed from the carrier 40 and ultimately closed and directed into the output 24.

With reference to FIGS. 4-5, a portion of the curing station 14 is illustrated. The curing station 14 includes a radiation emitter assembly 60 mounted on a mounting plate 62. The assembly 60 includes at least one radiation emitting device 64 such as one or more light emitting diodes (LED) or an LED array. An aperture 66 is formed in the mounting plate 62 that allows radiation emitted by the radiation emitting device 64 to be output toward the document 16 carried by the carrier 40. An optional transparent lens 68 may be disposed over the aperture 66 to protect the radiation emitting device 64. A reflective surface 70 of the curing station 14 is disposed opposite the aperture 66.

In an embodiment, with reference to FIGS. 2A-B and 5, the aperture 66 has a length $L_A$ extending in a direction perpendicular to the transport direction of the document 16 that is approximately equal to or only slightly greater than the length of the document 16 perpendicular to the transport direction. In FIGS. 2A and 2B, the length of the document 16 can be $L_{D1}$ if the document 16 is transported in an orientation such that edge 80 is a leading edge and edge 82 is a trailing edge. Alternatively, the length of the document 16 can be $L_{D2}$ if the document 16 is transported in an orientation such that the other edges form the leading edge and the trailing edge.

Figure 6:
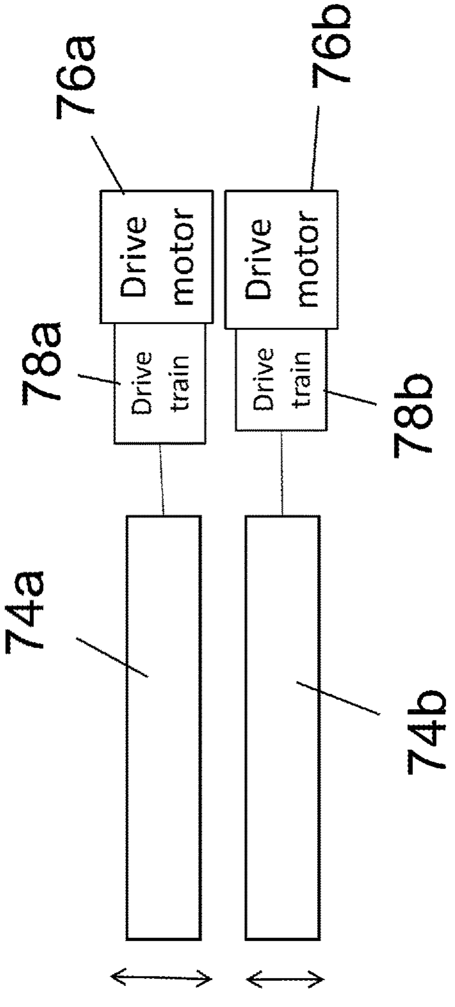
FIG. 6 illustrates one embodiment of a drive system for actuating the first and second shutters of the shutter mechanism of FIGS. 4-5.
Figure 7:
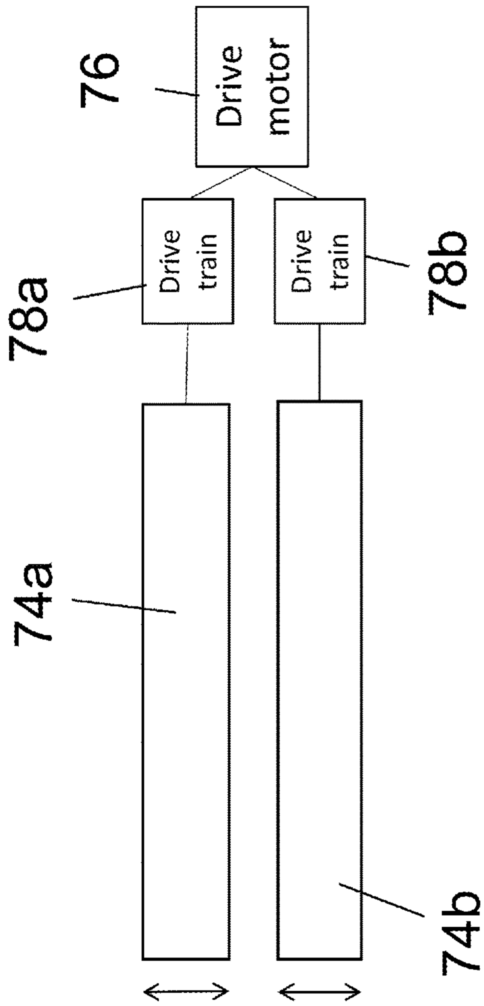
FIG. 7 illustrates another embodiment of a drive system for actuating the first and second shutters of the shutter mechanism of FIGS. 4-5.

In addition, with continued reference to FIGS. 4 and 5, as discussed in further detail below, a shutter mechanism 72 is provided to control the emission of radiation through the aperture 66. The shutter mechanism 72 includes a pair of shutters including a first movable shutter 74*a* and a second movable shutter 74*b*. The first movable shutter 74*a* is independently controllably movable separately from the second movable shutter 74*b*. For example, with reference to FIG. 6, in one embodiment, the first movable shutter 74*a* can be driven back and forth in the direction of the arrow via dedicated drive motor 76*a* and drive train 78*a*, while the second movable shutter 74*b* can be driven back and forth in the direction of the arrow via dedicated drive motor 76*b* and drive train 78*b*. In another embodiment, with reference to FIG. 7, the movable shutters 74*a*, 74*b* can share a common drive motor 76 that drives the separate drive trains 78*a*, 78*b* which separately and independently drive the movable shutters 74*a*, 74*b*. The drive motors 76, 76*a*, 76*b* and the drive trains 78*a*, 78*b* can have any construction suitable for driving the movable shutters 74*a*, 74*b* back and forth in the indicated directions. For example, the drive motors 76, 76*a*, 76*b* can be stepper motors and the drive trains 78*a*, 78*b* can include elements such as pulleys, drive belts and gears.

Figure 11:
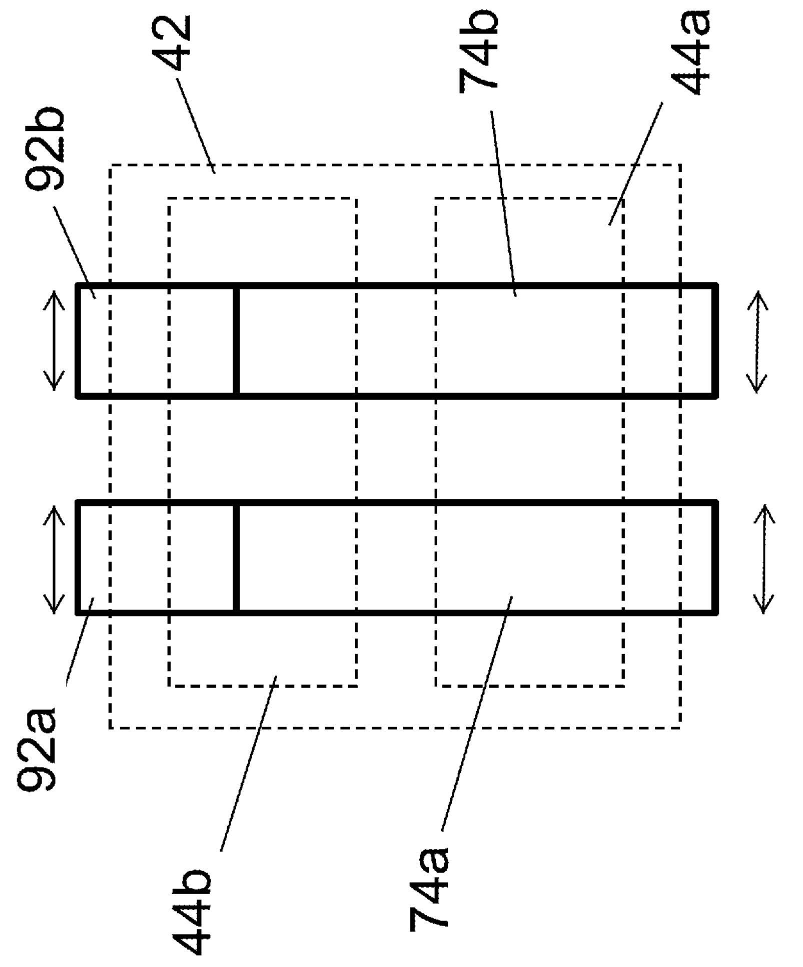
FIG. 11 illustrates an embodiment with additional movable shutters.

FIG. 11 illustrates another embodiment of the shutters 74*a*, 74*b*. In this embodiment, additional movable shutters 92*a*, 92*b* are provided that are movable independently from one another and movable independently from the shutters 74*a*, 74*b*. The shutters 92*a*, 92*b* can be actuated to move in a manner similar to the shutters 74*a*, 74*b*. The shutters 92*a*, 92*b* can be smaller than the shutters 74*a*, 74*b*, the same size as the shutters 74*a*, 74*b*, or larger than the shutters 74*a*, 74*b*. The use of the additional shutters 92*a*, 92*b* essentially splits the shutters 74*a*, 74*b* into two or more sections that allows for selective curing of portions of the document surface by controlling the appropriate shutter section(s) to block radiation from reaching the document surface in the window 44*a*, 44*b* of the window plate 42.

Referring to FIG. 4, in order to ensure complete curing of the radiation curable material applied to the document 16, the radiation emitting device 64 of the curing station 14 needs to be switched on before the leading edge of the document 16 reaches the aperture 66 and switched off after the trailing edge of the document 16 clears the aperture 66. Since the radiation emitting device 64 is turned on prior to the document 16 reaching the aperture 66 and turned off after the document 16 clears the aperture 66, without the shutter mechanism 72 radiation emitted by the radiation emitting device 64 would be emitted through the aperture 66 and impinge on the bottom of the station 14, including the reflective surface 70, for a small period of time before and after the document 16 passes under the aperture 66. However, reflections of the radiation from the reflective surface 70 and other surfaces in the station 14 can impinge upon the print head(s) in the print station 12 with enough energy to cure the radiation curable material in the print head(s). This problem is exacerbated the closer the curing station 14 and the print station 12 are to one another.

To prevent reflections of the emitted radiation, the movable shutters 74*a*, 74*b* of the shutter mechanism 72 are controlled to prevent emission of the radiation into the interior space of the station 14 prior to the leading edge of the document 16 reaching the aperture 66 and after the trailing edge of the carrier 40 and the document 16 pass the aperture 66 and before the radiation emitting device 64 is turned off.

Accordingly, with reference to FIG. 4, as the carrier 40 with the document 16 mounted thereon is transported in the transport direction indicated by the arrow through the station 14, the radiation emitting device 64 is controlled so that the radiation emitting device 64 is actuated to an on-state from an off-state after the radiation curable material is applied to the surface of the document 16 in the print station and prior to a leading edge of the identification document 16 reaching the aperture 66. As described in further detail below, during this time the shutter 74*a* fully covers the aperture 66. Once the leading edge of the carrier 40 or the document 16 reaches the aperture 66, the shutter 74*a* begins to uncover the aperture 66. Ultimately, the radiation emitting device 64 is actuated to the off-state after a trailing edge of the carrier 40 or the identification document 16 clears the aperture 66.

Figure 8A:
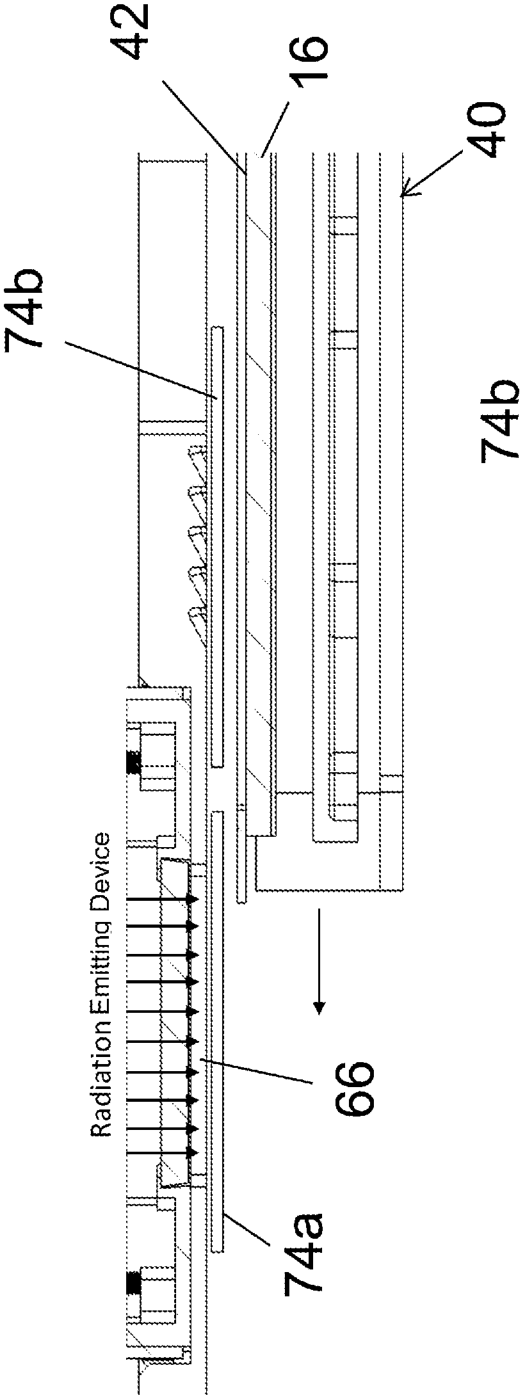
FIGS. 8A-8G illustrate an example sequence of operation of the shutter mechanism of FIGS. 4-5.

An example sequence of operations of the carrier 40, the radiation emitting device 64, and the movable shutters 74*a*, 74*b* will be described with respect to FIGS. 8A-G. FIG. 8A illustrates a point in time immediately after printing on the document 16 in the print station is complete with the carrier 40 that carries the document 16 transiting from the print station to the curing station in the direction of the arrow. As the carrier 40 is transiting, the radiation emitting device is switched on to emit radiation indicated by the arrows. At this time, the shutter 74*a* is stationary and fully covers the aperture 66, and the shutter 74*b* is also stationary and spaced from the shutter 74*a*.

Figure 8B:
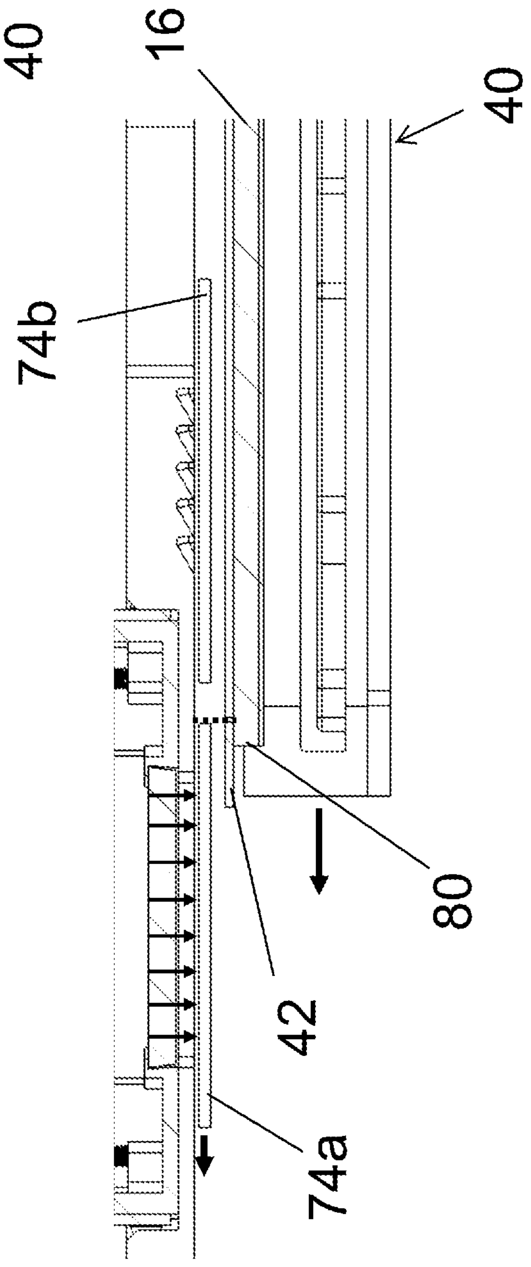
Figure 8C:
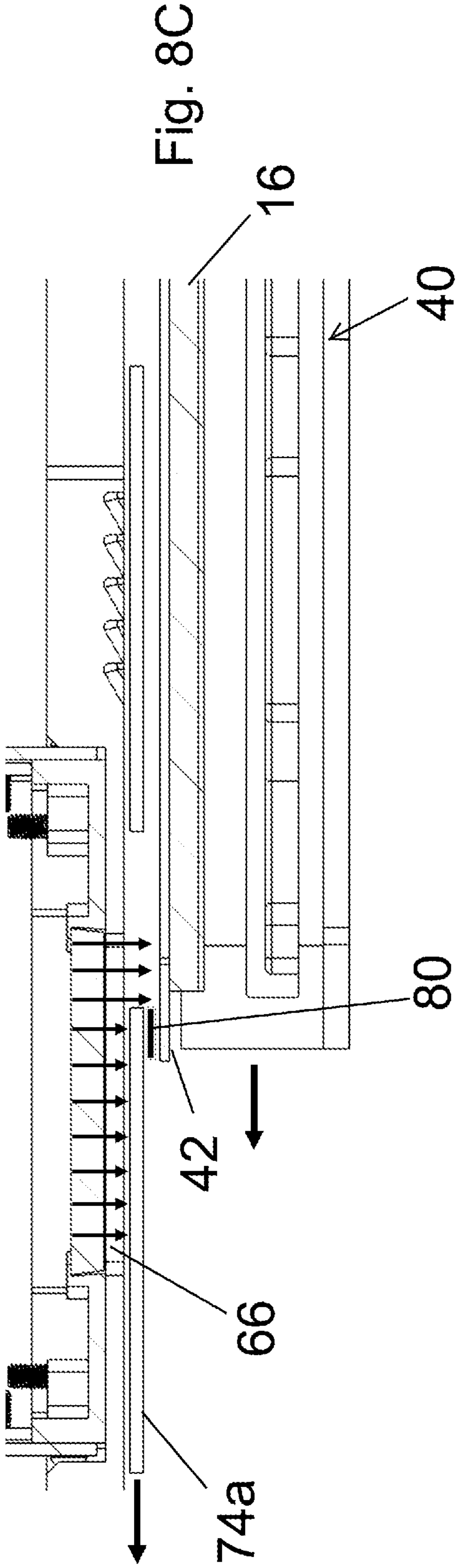
Figure 8D:
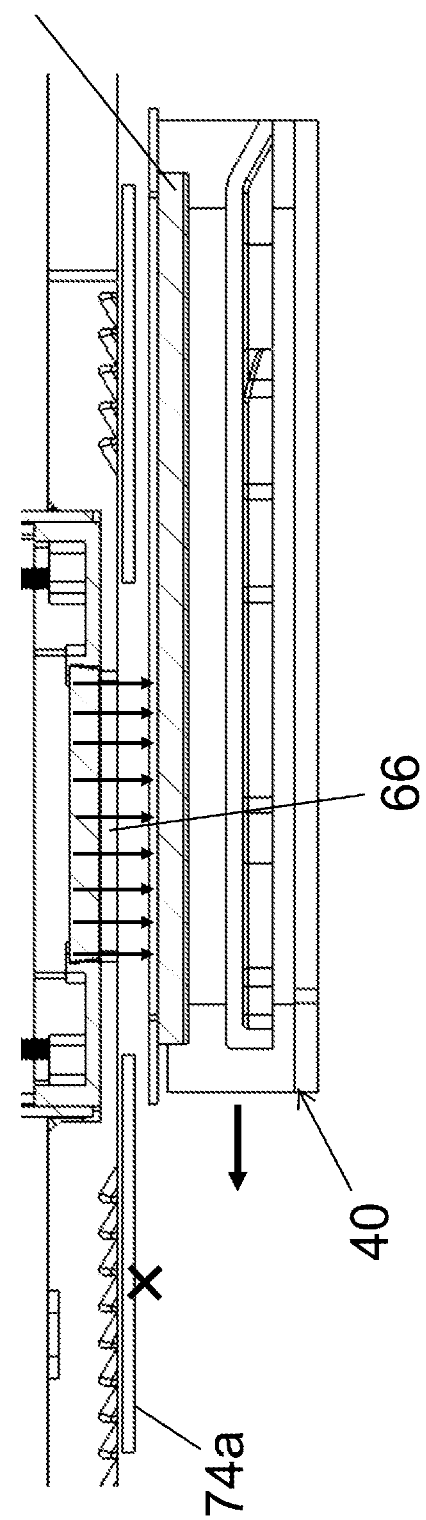

Referring to FIG. 8B, when the leading edge of the window plate 42 aligns with the upstream edge of the shutter 74*a*, the shutter 74*a* begins moving to the left as indicated by the arrow with the carrier 40 continuing to move to the left. In FIG. 8C, the shutter 74*a* and the carrier 40 continue to move and the shutter 74*a* starts to uncover the aperture 66 exposing the surface of the document 16 to the emitted radiation. At the same time, the shutter 74*a* and the window plate 42 overlap in the region 80 to prevent stray radiation. In FIG. 8D, the shutter 74*a* stops when the aperture 66 is fully uncovered and the document surface is fully exposed to the emitted radiation as the carrier 40 continues to move to the left.

Figure 8E:
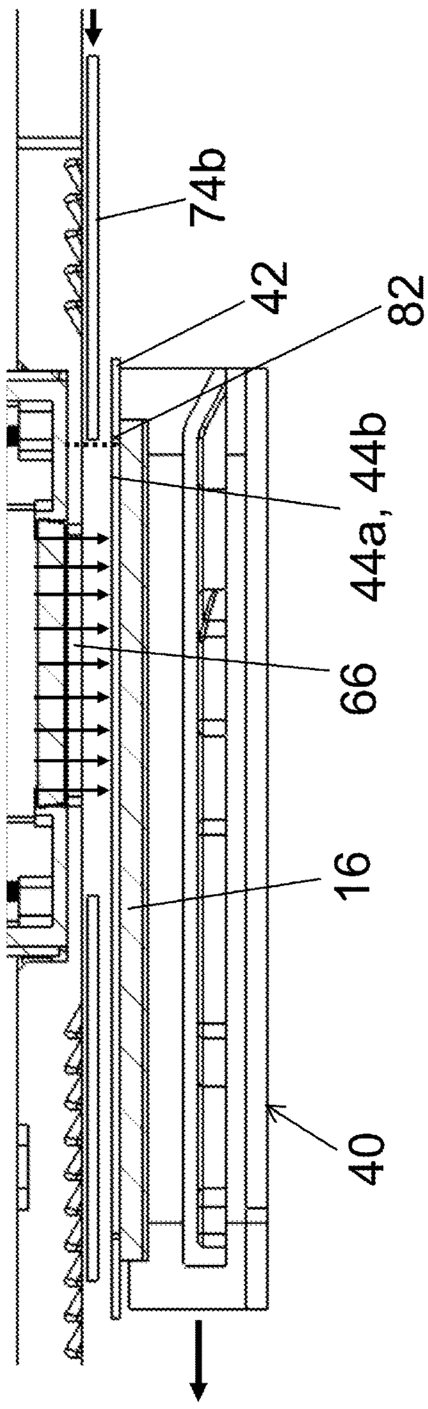
Figure 8F:
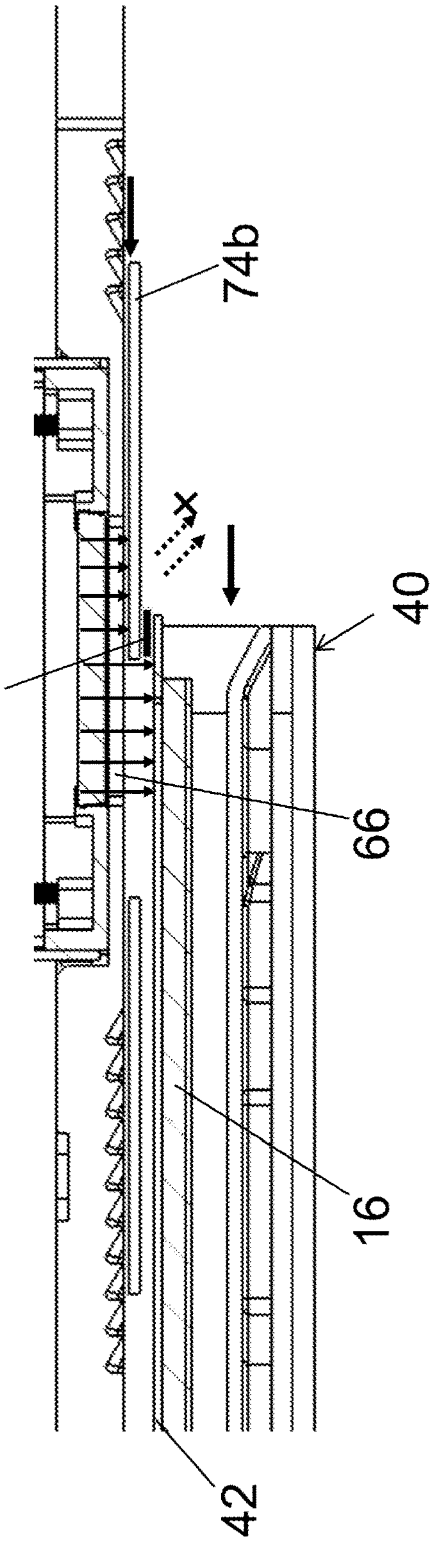
Figure 8G:
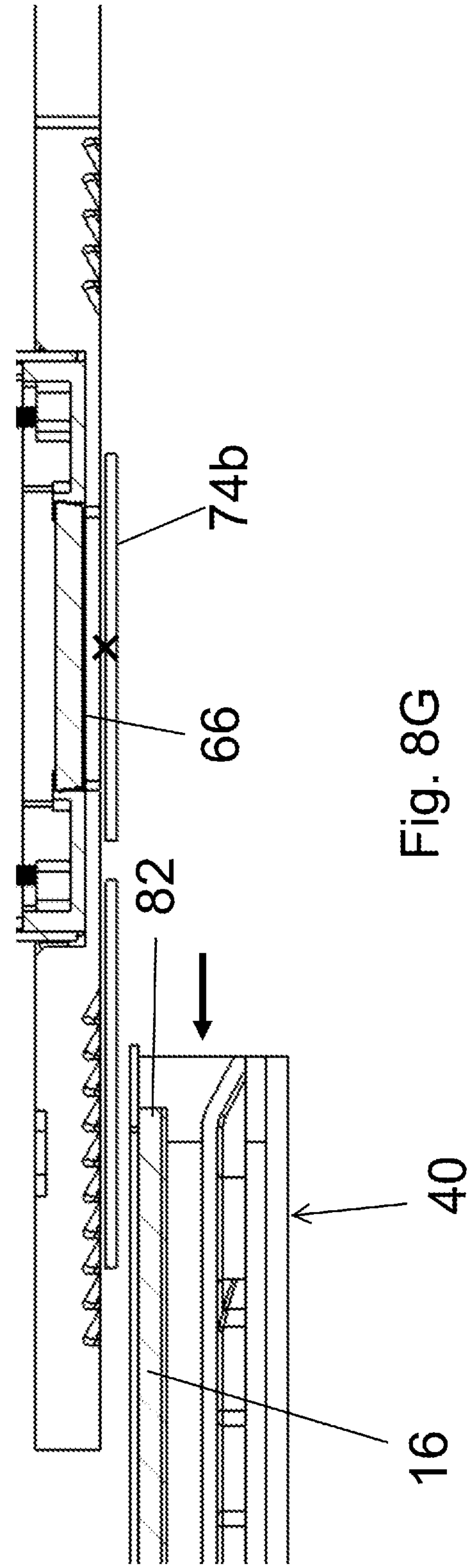

Referring to FIG. 8E, once the downstream edge of the shutter 74*b* is aligned with a trailing edge 82 of the windows 44*a*, 44*b* of the window plate 42, the shutter 74*b* is actuated to start moving to the left as indicated by the arrow in FIG. 8E to keep pace with the carrier 40. The shutter 74*b* continues to move together with the carrier 40 and overlaps the window plate 42 in the region 84, with the shutter 74*b* ultimately beginning to cover the aperture 66 to block stray radiation as depicted in FIG. 8F. Ultimately, the shutter 74*b* fully covers the aperture 66 as the carrier 40 continues to travel to the left as shown in FIG. 8G to the next station. Once the shutter 74*b* fully covers the aperture 66, and the trailing edge 82 of the document 16 is clear of the aperture 66, the radiation emitting device is then shut off.

The result of the sequences shown in FIGS. 8A-8G is that the shutter mechanism 72 is controlled so that: in a first curing segment, the identification document 16 is being transported by the carrier 40 and the first movable shutter 74*a* is moving while the second movable shutter is stationary 74*b* (FIGS. 8B and 8C); in a second curing segment, the first movable shutter 74*a* and the second movable shutter 74*b* are stationary while the identification document 16 is being transported by the carrier (FIG. 8D); and in a third curing segment, the identification document 16 is being transported by the carrier 40 and the second movable shutter 74*b* is moving while the first movable shutter 74*a* is stationary (FIGS. 88E and 8F).

Figure 9:
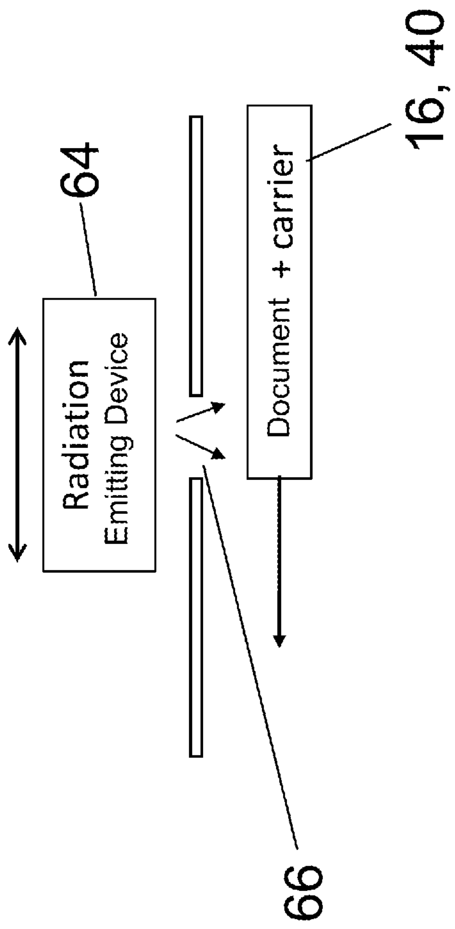
FIG. 9 illustrates another embodiment of controlling radiation emission in the curing station.

FIG. 9 illustrates another embodiment of controlling radiation emission in the curing station where the radiation emitting device 64 is controlled so as to be actuated to the on state from the off state after the radiation curable material is applied to the surface of the identification document 16 and prior to the leading edge of the identification document 16 reaching the aperture 66, and so that the radiation emitting device 64 is actuated to the off state after the trailing edge of the identification document 16 clears the aperture 66. In this embodiment, the radiation emitting device 64 is movably mounted so as to be moved across the aperture 66 as the document 16 passes by as indicated by the arrow in FIG. 9. In operation, the radiation emitting device 64 is actuated to the on state, and the movement of the radiation emitting device 64 must be controlled so that the radiation emitting device 64 begins to clear the edge of the aperture 66 simultaneously with the leading edge of the carrier 40 or the leading edge of the document 16 so that the leading edge of the document 16 gets a full cure dose of the emitted radiation without exposing the area below the carrier 40 and/or the document 16 to stray radiation. Once the radiation emitting device 64 fully covers the aperture 66, movement of the radiation emitting device 64 stops until the trailing edge of the carrier 40 and/or the document 16 approaches the edge of the aperture 66 and then the radiation emitting device 64 is actuated to move off of the aperture 66 before the trailing edge of the carrier 40 and/or the document 16 arrives so that no radiation may leak off of the trailing side. The movement of the radiation emitting device 64 can be used with or without the moveable shutters 74*a*, 74*b* in FIGS. 4-8G.

Figure 10:
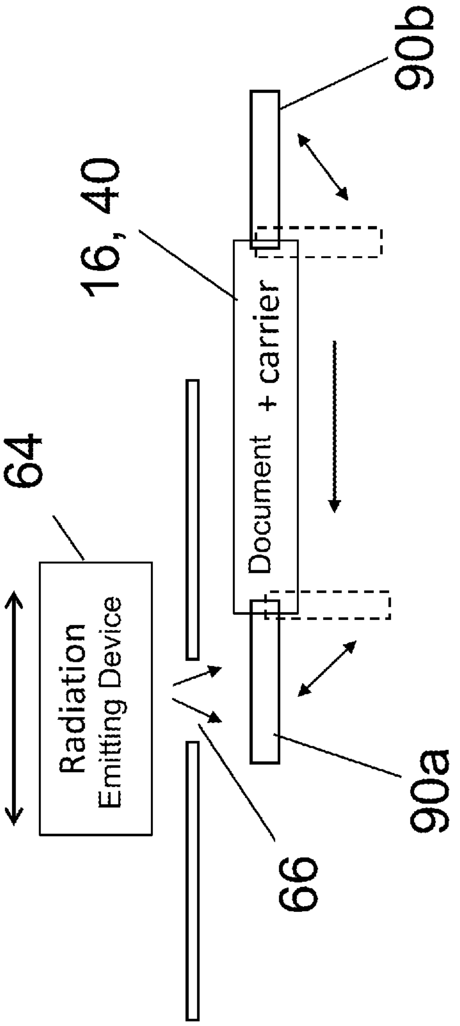
FIG. 10 illustrates an embodiment similar to FIG. 9 with wings that can extend and retract to control radiation emission.

Referring to FIG. 10, to further aid in preventing stray radiation, extendable and retractable wings 90*a*, 90*b* can be mounted on the carrier 40. FIG. 10 shows the wings 90*a*, 90*b* in an extended or deployed position (solid lines) and in a retracted or non-deployed position (dashed lines). The wings 90*a*, 90*b* are depicted as being pivotally attached to the carrier 40 for pivoting movement between the extended and retracted positions. However, the wings 90*a*, 90*b* can be mounted to the carrier 40 so as to be movable between extended and retracted positions in ways other than pivoting. The wing 90*b* is actuated to the retracted position when loading the document 16 onto the carrier 40 to prevent the wing 90*b* from interfering with loading the document 16 onto the carrier 40, with the wing 90*b* then being actuated to the extended position once the document 40 is loaded to help block stray radiation during curing of the radiation curable material on the document 16. When unloading the document 16 from the carrier 40, the wing 90*a* is actuated to the retracted position to prevent interference with document unloading. In an embodiment, both of the wings 90*a*, 90*b* can simultaneously pivot together between the extended and retracted positions during loading and unloading. In an embodiment, the upper surfaces of the wings 90*a*, 90*b* can be configured to help trap the emitted radiation. For example, the upper surfaces can be configured with hexagon shaped cavities that serve as light traps to prevent reflection of the emitting radiation. As illustrated in FIG. 10, the extendable and retractable wings 90*a*, 90*b* can be used with the embodiment in FIG. 9, or the wings 90*a*, 90*b* can be used with the embodiment in FIGS. 4-8G.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of printing radiation curable material on an identification document, comprising:

applying the radiation curable material to a surface of the identification document in a print station;

after applying the radiation curable material, transporting the identification document to a curing station for curing the radiation curable material applied to the surface of the identification document, the curing station includes at least one radiation emitting device that is controlled to have an on state and an off state and that emits radiation when in the on state that is suitable for curing the radiation curable material applied to the surface of the identification document, and an aperture through which radiation emitted by the at least one radiation emitting device can travel toward the identification document;

curing the radiation curable material applied to the surface of the identification document as the identification document is transported through the curing station in a transport direction, and controlling the at least one radiation emitting device so that the at least one radiation emitting device is actuated to the on state from the off state after the radiation curable material is applied to the surface of the identification document and prior to a leading edge of the identification document reaching the aperture, and so that the at least one radiation emitting device is actuated to the off state after a trailing edge of the identification document clears the aperture.

2. The method of claim 1, wherein the radiation curable material comprises ultraviolet curable material, and the at least one radiation emitting device comprises at least one light emitting diode.

3. The method of claim 1, wherein the curing station further includes a shutter mechanism associated with the aperture that controls the emission of radiation emitted by the at least one radiation emitting device through the aperture, the shutter mechanism includes a first movable shutter and a second movable shutter, the first movable shutter is independently controllably movable separately from the second movable shutter; and during curing, controlling the shutter mechanism so that:

in a first curing segment, the identification document is being transported and the first movable shutter is moving while the second movable shutter is stationary;

in a second curing segment, the first movable shutter and the second movable shutter are stationary while the identification document is being transported;

in a third curing segment, the identification document is being transported and the second movable shutter is moving while the first movable shutter is stationary.

4. The method of claim 3, wherein the first curing segment, the second curing segment, and the third curing segment occur in that order.

5. The method of claim 3, comprising moving the first movable shutter and the second movable shutter in directions parallel to the transport direction.

6. The method of claim 1, wherein the identification document comprises a passport or a plastic card.

7. The method of claim 1, further comprising moving the at least one radiation emitting device relative to the identification document in a direction parallel to the transport direction.

8. The method of claim 1, further comprising:

prior to or after applying the radiation curable material to the surface of the identification document, at least one of:

plasma treating the identification document;

encoding a magnetic stripe on the identification document;

programming an integrated circuit chip on the identification document;

embossing characters on the identification document;

indenting characters on the identification document;

using a laser to laser mark the identification document;

applying a laminate to the identification document;

applying a topcoat to the identification document.

9. The method of claim 1, wherein the print station is a drop-on-demand print station that includes at least one drop-on-demand print head.

10. An identification document personalization system, comprising:

a print station that is configured to apply radiation curable material to a surface of an identification document;

a curing station that includes at least one radiation emitting device that is controlled to have an on state and an off state and that emits radiation when in the on state that is suitable for curing radiation curable material applied to the surface of the identification document, and an aperture through which radiation emitted by the at least one radiation emitting device can travel toward the identification document;

a transport mechanism that transports the identification document from the print station to and through the curing station in a transport direction; and a controller connected to the curing station that controls the curing station so that the at least one radiation emitting device is actuated to the on state from the off state after the radiation curable material is applied to the surface of the identification document and prior to a leading edge of the identification document reaching the aperture, and so that the at least one radiation emitting device is actuated to the off state after a trailing edge of the identification document clears the aperture.

11. The identification document personalization system of claim 10, wherein the radiation curable material comprises ultraviolet curable material, and the at least one radiation emitting device comprises at least one light emitting diode.

12. The identification document personalization system of claim 10, wherein the curing station further includes a shutter mechanism associated with the aperture that controls the emission of radiation emitted by the at least one radiation emitting device through the aperture, the shutter mechanism includes a first movable shutter and a second movable shutter, the first movable shutter is independently controllably movable separately from the second movable shutter.

13. The identification document personalization system of claim 12, wherein the controller controls the curing station so that during curing, the shutter mechanism is controlled so that:

in a first curing segment, the identification document is transported and the first movable shutter is moving while the second movable shutter is stationary;

in a second curing segment, the first movable shutter and the second movable shutter are stationary while the identification document is transported;

in a third curing segment, the identification document is transported and the second movable shutter is moving while the first movable shutter is stationary; and wherein the first curing segment, the second curing segment, and the third curing segment occur in that order.

14. The identification document personalization system of claim 12, wherein the first movable shutter and the second movable shutter are each movable in directions parallel to the transport direction.

15. The identification document personalization system of claim 10, wherein the identification document comprises a passport or a plastic card.

16. The identification document personalization system of claim 10, wherein the at least one radiation emitting device is mounted so as to be movable relative to the identification document in a direction parallel to the transport direction.

17. The identification document personalization system of claim 10, further comprising:

at least one of the following prior to or after the print station and the curing station:

a plasma treater that is configured to plasma treat the identification document;

an encoder configured to encode a magnetic stripe on the identification document;

a chip programmer configured to program an integrated circuit chip on the identification document;

an embosser configured to emboss characters on the identification document;

an indenter configured to indent characters on the identification document;

a laser configured to laser mark the identification document;

a laminator configured to apply a laminate to the identification document;

a topcoat applicator configured to apply a topcoat to the identification document.

18. The identification document personalization system of claim 10, wherein the print station comprises a drop-on-demand print station that includes at least one drop-on-demand print head.

* * * * *